Patented Dec. 30, 1941

2,268,091

UNITED STATES PATENT OFFICE 2,268,091

TANNING AGENT

Joseph G. Niedercorn, Riverside, and Frederick D. Thayer, Jr., Darien, Conn., assignors to American Cyanamid Company, New York, N. Y., a corporation of Maine No Drawing. Application November 1, 1940, Serial No. 363,875

2 Claims. (Cl. 149—5)

This invention relates to the bleaching and tanning of hides, skins and leather, using the formaldehyde condensation product of o-amyl phenol monosulfonate as the agent.

It is well known that the formaldehyde condensation products of many of the sulfonated lower phenols are useful tanning agents, particularly for the finishing of chrome-tanned leather. These compounds, however, have a tendency to darken and discolor upon storage or exposure to light, and their value as bleaching agents has been seriously questioned for this reason.

In order to avoid difficulties due to the darkening of the lower phenolic syntans it has been proposed to employ some of the higher alkyl phenols as starting materials, notably the p-tertiary alkyl phenols containing 6 or more carbon atoms in the alkyl group. Para-substituted alkyl phenols of lower molecular weight have been considered unsuitable for this purpose, since they are solids at ordinary sulfonation temperatures and would therefore require the use of a solvent during sulfonation, which would introduce a source of considerable expense and difficulty in the process.

We have now discovered that the condensation product obtained by condensing two molecular proportions of o-amyl phenol monosulfonate with one molecular proportion of formaldehyde is an excellent synthetic tanning agent that possesses light stability to a high degree. This discovery is quite unexpected, for the p-substituted higher alkyl phenols have previously been considered as the only type that could be used for the production of light-stable synthetic tanning agents. Moreover, our discovery permits the production of light-stable syntans without the use of solvents or other special sulfonating procedure, for o-amyl phenol is a liquid at ordinary temperatures and can be sulfonated with 90-98% sulfuric acid by the usual sulfonation procedure. We have found that the condensation of the sulfonation product with formaldehyde also presents no unusual difficulties, so that the finished tanning and bleaching agent of our invention is cheap and easily manufactured by standard manufacturing processes.

In practicing our invention the o-amyl phenol monosulfonate is prepared by reacting 164 parts by weight of o-amyl phenol and about 155 parts of 95% sulfuric acid or a corresponding quantity of stronger or weaker sulfuric acid, which is preferably free from iron. The acid is added slowly to the phenol over a period of about ½ hour with continuous agitation while maintaining the temperature at about 60–70° C. The agitation is then continued for about 1½ hours longer, when the sulfonation is complete. The product is a red-brown viscous liquid, which is preferably cooled and diluted by the addition of about 72 parts of ice before being condensed with formaldehyde.

Condensation of the sulfonated product is preferably carried out at about 20–30° C. over a period of 4 hours. The formaldehyde solution is added slowly below the surface of the liquid with vigorous agitation, the total quantity amounting to ½ mole of 37% aqueous formaldehyde solution for each mole of the o-amyl phenol monosulfonate. After the formaldehyde addition is completed the mixture is allowed to stand for about 14–16 hours in order to complete the condensation, after which it may be further diluted with water to the desired concentration for use. The product may then be neutralized with ammonium hydroxide to any desired degree, the final acidity depending on the type of leather to be bleached. Excellent results have been obtained on side leather with a product neutralized to 0.5 N acidity, as shown in the following example.

Example

Three lots of chrome tanned side leather were finished with the o-amyl phenol syntan described above. Each lot, consisting of 16 sides (100 lbs. shaved weight), was bleached with 24 gallons of syntan solution at 90° F. for 30 minutes, washed 15 minutes with water at 120° F., drained, and fatliquored for 30 minutes at 120° F. with an emulsion of 1 lb. raw neat's-foot oil and 2¾ lbs. sulfonated vegetable oil in 12 gallons of water.

The bleaching liquor of lot 1 contained 5.1 lbs. syntan and 80 grams sulfuric acid in 24 gallons of water; lot 2 contained 10 lbs. syntan and 80 grams sulfuric acid; and lot 3 contained 10 lbs. syntan and 160 grams sulfuric acid. The pH values were as follows:

|  | Lot 1 | | Lot 2 | | Lot 3 | |
| --- | --- | --- | --- | --- | --- | --- |
|  | Surface | Inside | Surface | Inside | Surface | Inside |
| Shaved stock | 3.5 | 4.0 | 3.5 | 4.0 | 3.5 | 4.0 |
| After bleaching | 2.0 | 3.5 | 1.8 | 3.8 | 1.6 | 3.8 |
| After wash | 3.8 | 4.0 | 3.8 | 4.0 | 3.5 | 4.0 |
| After fatliquor | 4.0 | 4.2 | 3.8 | 4.2 | 3.8 | 4.0 |

All three lots were satisfactory as to color and light-stability. There was a slight but definite difference in the character of the leather, lot 1 being firm but empty, lot 2 being full and firm, and lot 3 being full but soft. Lot 2 was definitely the most desirable of the three, indicating that 10% of the syntan solution is the proper amount for chrome-tanned side leather.

What we claim is:

1. A method of tanning and bleaching hides, skins and leather which comprises immersing the stock in a solution of an o-amyl phenol monosulfonate-formaldehyde condensation product.

2. A synthetic tanning and bleaching agent for hides, skins and leather comprising essentially an aqueous solution of a partially neutralized o-amyl phenol monosulfonate-formaldehyde condensation product.

JOSEPH G. NIEDERCORN.
FREDERICK D. THAYER, Jr.